Nov. 26, 1957  F. W. SCHWARTZ  2,814,181
REGENERATIVE HEAT EXCHANGERS FOR PAIRED GAS TURBINES
Filed Nov. 18, 1952

FREDERICK W. SCHWARTZ
INVENTOR.

BY
ATTORNEY

United States Patent Office 2,814,181
Patented Nov. 26, 1957

2,814,181
REGENERATIVE HEAT EXCHANGERS FOR PAIRED GAS TURBINES

Frederick W. Schwartz, Wellsville, N. Y., assignor to The Air Preheater Corporation, New York, N. Y.

Application November 18, 1952, Serial No. 321,067

4 Claims. (Cl. 60—39.15)

The present invention relates to a gas turbine power plant wherein a pair of gas turbines are geared together to a common power take-off, and has for its general object the provision of a paired gas turbine power plant of this type which is highly efficient in operation and yet simple to build and inexpensively produced.

It is a particular object of this invention to provide for a paired turbine arrangement as set forth above wherein the cool combustion air and the hot turbine exhaust gases flowing through the system are forced to change direction of flow a minimum number of times so as to maintain the pressure loss from such turns at a low level, and in so doing provide for a turbine arrangement having a comparatively high efficiency.

According to the present invention it is proposed to arrange the apparatus so that hot gases exhausting under pressure from the first turbine are conducted to a heat exchanger which preheats the compressed air being supplied to the combustion chamber of a second turbine. In a similar manner the exhaust gases from the second turbine are used to preheat the compresssed air supplied to the first turbine.

The invention is exemplified in the following description when read with reference to the accompanying drawings in which.

Figure 1:
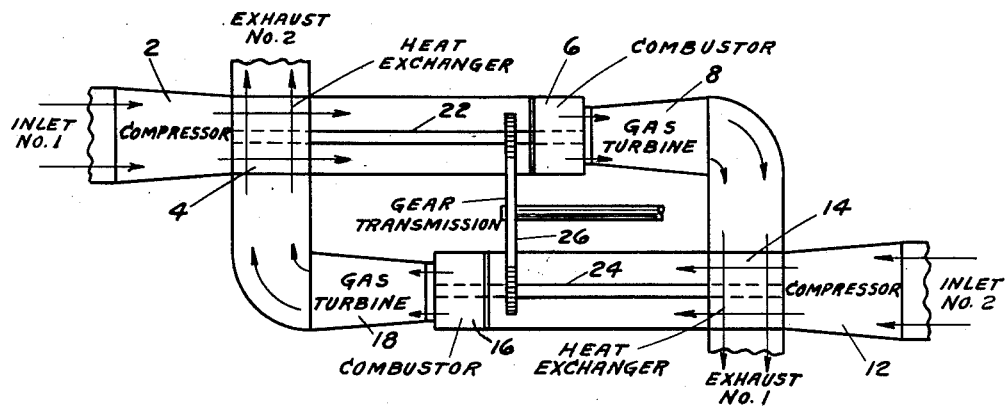
Figure 1 shows diagrammatically a gas turbine power plant according to the present invention in which the heat exchangers used are of the cross-flow type.

In Figure 1 compressed air from the compressor 2 is led directly to the cross-flow recuperative heat exchanger 4 where it is allowed to flow in a heat transfer relationship with the hot exhaust gas from turbine 18. The air flowing through said heat exchanger 4 is therefore heated before it passes to combustor 6 for turbine 8 where it is mixed with fuel being supplied from a suitable outside source. The air-fuel mixture is then ignited, and the resulting highly heated gases of combustion expand in the turbine to perform the useful work of rotating the turbine. After the gas has expanded through the turbine, it is led to a cross-flow heat exchanger 14 where the residual heat is utilized to preheat the combustion air being delivered from compressor 12 to the combustor 16.

Compressor 2 is directely connected to turbine 8 by shaft 22, while the compressor 12 is directly connected to turbine 18 by means of shaft 24. The two shafts 22 and 24 are in turn coupled together through a transmission 26 which drives a conventional power take-off shaft so that the combined power from the two turbines may be transmitted simultaneously to a single point of usage.

In the entire arrangement above disclosed, a minimum number of right angle turns in the ductwork is made necessary because of the "in-line" arrangement of the compressor, turbine and heat exchanger. In practice such an arrangement of units may require additional bends and turns in the ducting not apparent from the diagrammatic showing presented herewith, the necessity for such bends will, however, be held to a minimum so that the over-all efficiency of this arrangement may be much higher than that of a comparable system not connected in this manner.

Figure 2:
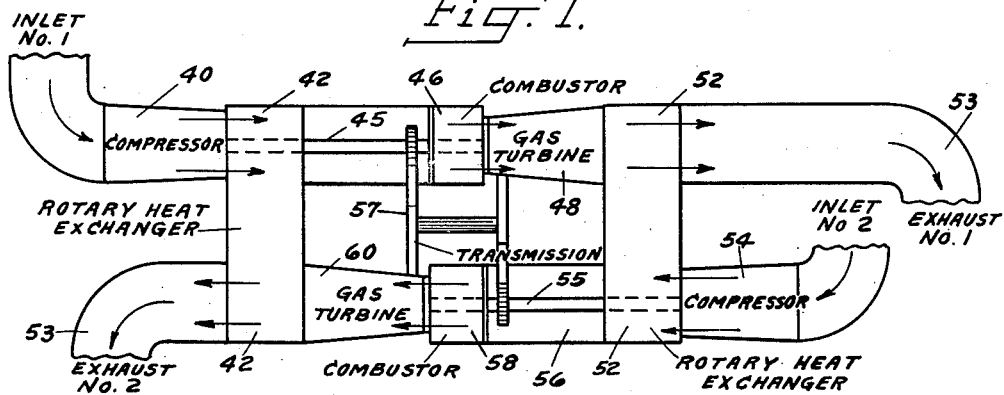
Figure 2 illustrates a paired turbine arrangement utilizing rotary regenerative type heat exchangers.

Figure 2 illustrates a gas turbine power plant arrangement differing from that of Figure 1 chiefly in that the heat exchangers used are of the rotary regenerative rather than the conventional cross-flow type. In using a regenerative type heat exchanger it is possible that additional bends in the ducting arrangement may be eliminated in the manner schematically illustrated.

Specifically, compressed air from the compressor 40 enters the air side of the rotary regenerative heat exchanger 42 in which the heat absorbing elements of the rotor have been heated by the exhaust gases from the turbine 60. Compressed air after being heated in the heat exchanger 42 is then channeled to the combustor section 46 of turbine 48. Here as in the first disclosed apparatus, fuel is combined with the heated compressed air and the resulting gaseous mixture is then ignited by a suitable ignition device. The highly heated gases of combustion are then discharged into turbine 48 where they expand in driving the turbine before being exhausted to the gas side of regenerative heat exchanger 52. The turbine discharge gases passing through the rotary regenerator 52 then transmit heat to the elements carried by the rotor therein before being exhausted to the atmosphere.

Adjacent the gas exhaust port of the heat exchanger 52 is the cold air inlet to compressor 54. The compressed air supplied by said compressor passes through the heat exchanger 52 where it takes up heat from the heated rotor section. Heated compressed air is channeled by duct 56 to the combustor 58 where it is mixed with fuel and ignited in the manner disclosed for combustor 46. The highly heated gases of combustion drive the turbine 60 and then pass on to the gas side of heat exchanger 42 where they give up heat to the heat exchanger elements in the rotor before being exhausted to the atmosphere through outlet 53.

Turbine 48 drives the compressor 40 by means of axially aligned shaft 45, while the turbine 60 drives the compressor 54 by means of axially alined shaft 55. These drive shafts are coupled one to another by means of transmisssion device 57 which supplies the coupled power to a common power take-off.

In the arrangement just disclosed it is possible that even fewer bends or turns are necessary in the ducting system than in the system involving the cross-flow type of heat exchanger, since the combustion air and the hot exhaust turbine gases may pass through a regenerative heat exchanger in a parallel relation rather than at right angles.

Figure 3:
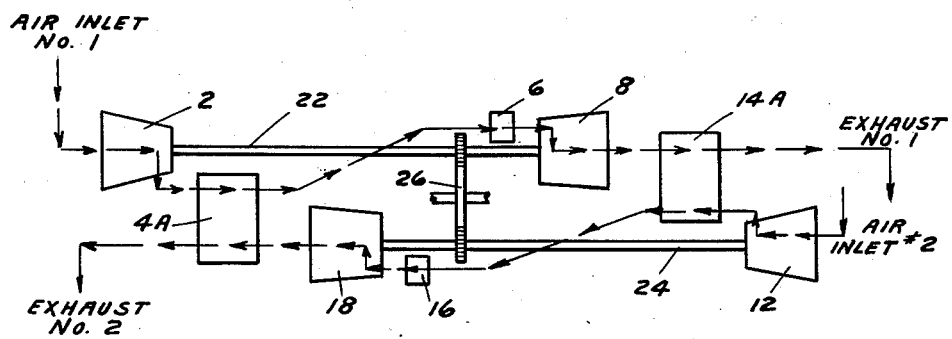
Figure 3 shows a paired turbine arrangement utilizing counterflow type recuperative heat exchangers.

Figure 3 shows a paired turbine power plant similar to that of Figure 1 differing only in that the recuperative heat exchangers 4A and 14A are of the counter-flow type. The operation of the turbine power plant of Figure 3 is similar to that disclosed for the device of Figure 1, there being a slight difference only in the ductwork required to connect the various units of the system. Furthermore, the arrangement has been made with specific attention being given to a possible application of such a paired turbine power plant to the motive power field.

What I claim is:

1. A gas turbine power plant having spaced turbine systems whose axes lie in generally parallel planes with the inlet of the turbine in one system and the exhaust of the turbine in the other system arranged to face the same direction; each system comprising in combination a gas turbine; an air compressor axially aligned with said gas turbine and arranged to rotate on a common drive shaft therewith; duct means directing air flow from an outlet from each compressor to an aligned turbine inlet; a combustor in each duct means imparting heat to said air flow; and regenerative heat exchanger means adapted to receive hot exhaust gases from one turbine and transfer heat therefrom to compressed air traversing the duct means of the spaced system.

2. A gas turbine power plant as defined in claim 1 wherein the duct means connecting paired turbine and compressor units is substantially free from turns or obstructions requiring a change in direction of fluid flowing therethrough.

3. A turbine power plant having spaced turbine systems whose axes lie in generally parallel planes, each system comprising in combination a gas turbine assembly having a compressed air inlet and an exhaust gas outlet with the inlet of the turbine in one system and the exhaust of the turbine in the other system arranged to face the same direction; an axial flow air compressor with inlet and outlet ports axially aligned with each gas turbine and mounted to rotate therewith about a common drive shaft; duct means interconnecting a compressor outlet with the compressed air inlet to each aligned turbine; a combustor in each duct means providing heated gases for delivery to the turbine; heat exchange means intermediate the turbine exhaust gas outlet and said duct means adapted to transmit heat from the hot turbine exhaust gases of one turbine system to compressed air of the other turbine system in said duct means; and a transmission system intermediate the turbine plants arranged to couple them together to a common power take-off.

4. A gas turbine power plant having spaced turbine systems whose axes lie in generally parallel planes, each system comprising in combination a gas turbine having a compressed air inlet and an exhaust gas outlet with the inlet of the turbine in one system and the exhaust of the turbine in the other system arranged to face the same direction; an air compressor axially aligned with each gas turbine and mounted to rotate about a common drive shaft, each air compressor including an inlet port and an outlet port arranged to permit the flow of air therethrough; duct means connecting the outlet of each compressor to the inlet of each aligned turbine; a combustor in each duct means adapted to transform air from the compressor into hot gases for the turbine; inlet duct means directing a stream of air to each compressor and outlet duct means exhausting a stream of gas away from each turbine; rotary regenerative heat exchange means having a portion thereof positioned in the turbine outlet duct of one system to absorb heat from the hot gases flowing therethrough while a circumferentially spaced portion is positioned in the duct means of the other system to impart heat to the air flowing therethrough; and a transmisssion system intermediate the contra-lying turbine plants provided to couple them together to a common power take-off.

References Cited in the file of this patent

UNITED STATES PATENTS

| | | |
|---|---|---|
| 2,441,488 | Howell | May 11, 1948 |
| 2,613,749 | Price | Oct. 14, 1952 |
| 2,667,034 | Alcock | Jan. 26, 1954 |
| 2,674,089 | Boestad et al. | Apr. 6, 1954 |

FOREIGN PATENTS

| | | |
|---|---|---|
| 824,080 | France | Nov. 3, 1937 |